United States Patent
Mori

(10) Patent No.: US 9,142,341 B2
(45) Date of Patent: Sep. 22, 2015

(54) METHOD OF MANUFACTURING HEXAGONAL FERRITE MAGNETIC POWDER AND ITS USAGE

(71) Applicant: FUJIFILM Corporation, Minato-ku, Tokyo (JP)

(72) Inventor: Masahiko Mori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 191 days.

(21) Appl. No.: 13/905,391

(22) Filed: May 30, 2013

(65) Prior Publication Data

US 2013/0323161 A1 Dec. 5, 2013

(30) Foreign Application Priority Data

May 30, 2012 (JP) .................................. 2012-122752

(51) Int. Cl.
*H01F 1/11* (2006.01)
*C01G 49/00* (2006.01)
(Continued)

(52) U.S. Cl.
CPC .............. *H01F 1/01* (2013.01); *C01G 49/0036* (2013.01); *C01G 49/0072* (2013.01); *C04B 35/2683* (2013.01); *C04B 35/62665* (2013.01); *G11B 5/70678* (2013.01); *H01F 1/11* (2013.01); *C01P 2002/54* (2013.01); *C01P 2004/64* (2013.01); *C01P 2006/12* (2013.01); *C01P 2006/42* (2013.01); *C04B 2235/3215* (2013.01); *C04B 2235/3217* (2013.01); *C04B 2235/3218* (2013.01); *C04B 2235/3409* (2013.01);

(Continued)

(58) Field of Classification Search
CPC ... H01F 1/11; C01G 19/0036; G11B 5/70678
USPC ........................................ 252/62.63; 427/128
See application file for complete search history.

(56) References Cited

U.S. PATENT DOCUMENTS 6,790,523 B2 9/2004 Masaki et al.
8,545,714 B2 10/2013 Suzuki et al.
(Continued)

FOREIGN PATENT DOCUMENTS

| JP | 2003-162809 A | 6/2003 |
| JP | 2003296916 A | 10/2003 |
| JP | 2005340673 A | 12/2005 |
| JP | 2011225417 A | 11/2011 |

OTHER PUBLICATIONS

Office Action issued on May 20, 2014 from Japanese Patent Office in Japanese Application No. 2012- 122752.

*Primary Examiner* — Carol M Koslow
(74) *Attorney, Agent, or Firm* — Sughrue Mion, PLLC

(57) ABSTRACT

An aspect of the present invention relates to a method of manufacturing hexagonal ferrite magnetic powder, which comprises preparing a melt by melting a starting material mixture comprising a hexagonal ferrite-forming component and a glass-forming component and rapidly cooling the melt to obtain a solidified product, heating the solidified product to precipitate hexagonal ferrite magnetic particles and glass components in the solidified product, subjecting the solidified product to an acid treatment following the heating to remove the glass components by dissolution, incorporating the hexagonal ferrite magnetic particles obtained following the acid treatment into an acidic aqueous solution, followed by separating the particles dispersed in the aqueous solution and the precipitated particles, and subjecting the precipitated particles to a cleaning treatment and then collecting the particles.

16 Claims, 1 Drawing Sheet

(51) Int. Cl.
  *G11B 5/706* (2006.01)
  *H01F 1/01* (2006.01)
  *C04B 35/26* (2006.01)
  *C04B 35/626* (2006.01)
(52) U.S. Cl.
  CPC . *C04B2235/5409* (2013.01); *C04B 2235/5454* (2013.01); *C04B 2235/767* (2013.01)

(56) References Cited

U.S. PATENT DOCUMENTS

| | | | |
|---|---|---|---|
| 8,840,802 B2 * | 9/2014 | Mori et al. | 252/62.58 |
| 2003/0190495 A1 | 10/2003 | Masaki et al. | |
| 2011/0244272 A1 | 10/2011 | Suzuki et al. | |
| 2014/0011055 A1 | 1/2014 | Suzuki et al. | |

* cited by examiner

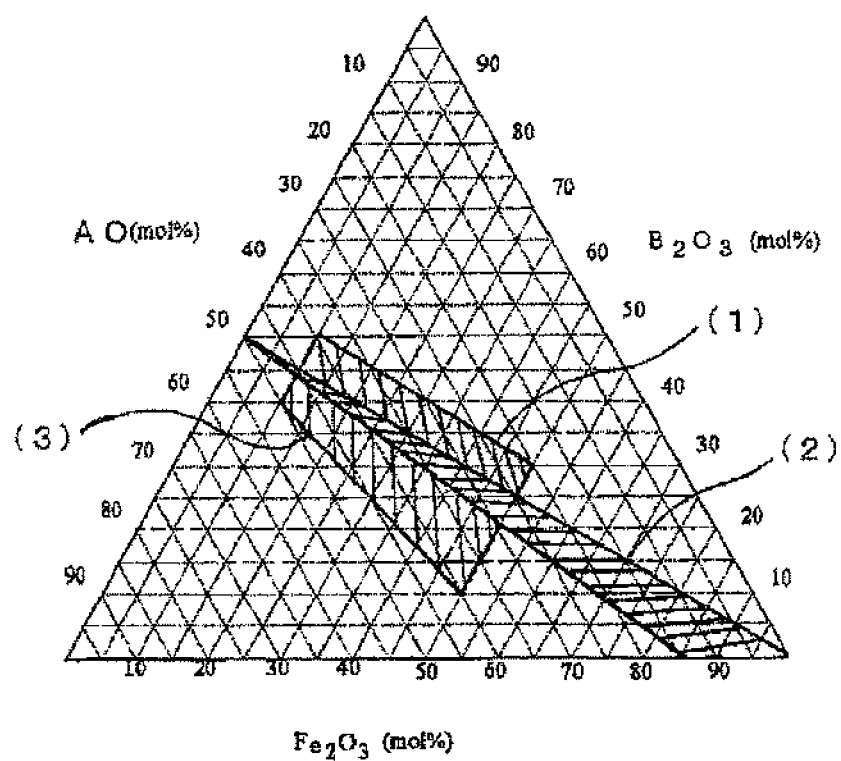

METHOD OF MANUFACTURING HEXAGONAL FERRITE MAGNETIC POWDER AND ITS USAGE

CROSS-REFERENCE TO RELATED APPLICATIONS

This application claims the benefit of priority under 35 USC 119 to Japanese Patent Application No. 2012-122752 filed on May 30, 2012, which is expressly incorporated herein by reference in its entirety.

BACKGROUND OF THE INVENTION

1. Field of the Invention

The present invention relates to hexagonal ferrite magnetic powder and to a method of manufacturing the same. More particularly, the present invention relates to hexagonal ferrite magnetic powder exhibiting good magnetic characteristics and to a method of manufacturing the same.

Still further, the present invention relates to a magnetic recording medium comprising hexagonal ferrite magnetic powder obtained by the above manufacturing method in a magnetic layer, and to a method of manufacturing the same.

2. Discussion of the Background

Conventionally, ferromagnetic metal magnetic particles have been primarily employed in the magnetic layer of magnetic recording media for high-density recording. Ferromagnetic metal magnetic particles are acicular particles comprised chiefly of iron, and have been employed in magnetic recording media for various applications requiring particle size reduction and high coercive force for high density recording.

With an increase in the quantity of information being recorded has come the requirement of recording at ever higher densities on magnetic recording media. However, in recording at higher densities, limits to improvement of the ferromagnetic metal magnetic particles have begun to appear. By contrast, hexagonal ferrite magnetic particles can exhibit coercive force of a degree found in permanent magnetic materials. The magnetic anisotropy that is the basis of coercive force is derived from a crystalline structure, so a high coercive force can be maintained even when the size of the particles is reduced. A magnetic recording medium with a magnetic layer in which hexagonal ferrite magnetic particles are employed will exhibit good high density characteristics due to its vertical component. Thus, hexagonal ferrite magnetic particles are a ferromagnetic material that is suited to achieving higher densities.

Known methods of manufacturing hexagonal ferrite magnetic powder include the glass crystallization method, the hydrothermal synthesis method, and the coprecipitation method. The glass crystallization method is said to be a good method of manufacturing hexagonal ferrite for use in magnetic recording media because magnetic powder having the desired suitability to size reduction and single particle dispersibility in magnetic recording media can be obtained. As a result, various methods of manufacturing hexagonal ferrite magnetic powder by the glass crystallization method have been studied (for example, see Japanese Unexamined Patent Publication (KOKAI) No. 2003-162809, which is expressly incorporated herein by reference in its entirety).

The process of manufacturing hexagonal ferrite magnetic powder by the glass crystallization method generally comprises the following steps:

(1) Melting a starting material mixture comprising hexagonal ferrite-forming components and glass-forming components to obtain a melt;
(2) Rapidly cooling the melt to obtain a solidified product (amorphous material);
(3) Heat treating the solidified to cause hexagonal ferrite magnetic particles (referred to as "hexagonal ferrite particles" or simply "particles", hereinafter) and a glass component to precipitate out; and
(4) Subjecting the heat-treated product to an acid treatment and a cleaning treatment to dissolve away the glass component, and collecting the hexagonal ferrite magnetic particles.

The particle diameter of the hexagonal ferrite particle obtained by the above process can be controlled by means of the heating conditions (heating temperature and duration) in step (3) above. The heating conditions are determined so that particles of the desired size precipitate out. However, a size distribution is present in the particles that precipitate out, and it is extremely difficult to conduct the process in a manner that avoids forming ultrafine particles that are much smaller than the desired particle diameter. However, these ultrafine particles include components that become superparamagnetic and do not contribute to magnetic recording and components that are affected by thermal fluctuation and destabilize magnetization, and are thus desirably removed before manufacturing a magnetic recording medium. In this regard, Japanese Unexamined Patent Publication (KOKAI) No. 2003-162809 proposes subjecting hexagonal ferrite magnetic powder that has been produced by the glass crystallization method to wet sorting with an elutriation apparatus to remove the fine particles. However, it is difficult to sort to a high degree with an elutriation apparatus the primary particles of a nano order of magnitude that are employed in magnetic recording media for high-density recording.

As set forth above, there is need for a new sorting means that makes it possible to selectively remove ultrafine particles from hexagonal ferrite magnetic powder obtained by the glass crystallization method to obtain a hexagonal ferrite magnetic powder that can exhibit good magnetic characteristics in magnetic recording media for high-density recording.

SUMMARY OF THE INVENTION

The present invention provides for a means of obtaining hexagonal ferrite magnetic powder that can exhibit good magnetic characteristics by selectively removing the ultrafine particle component in the glass crystallization method.

The present inventor conducted extensive research on the behavior of particles following acid treatment in the glass crystallization method in this regard. They found that when particles following the acid treatment were added to an acidic aqueous solution, ultrafine particles that were far from the center of the particle size distribution dispersed in the aqueous solution and other particles precipitated. They thus discovered that by removing the dispersed ultrafine particles along with the solution, it was possible to selectively remove the ultrafine particles.

This point will be described in greater detail. In an acidic aqueous solution, hexagonal ferrite particles develop a positive charge by absorbing protons. In conjunction with this, in an aqueous slurry containing charged particles, the electrolyte concentration (ion concentration) is known to affect the state of dispersion/aggregation. In acid treatment to dissolve and remove the glass component, large quantities of glass components dissolve into the slurry and are ionized. As a result, numerous ions are present around the hexagonal ferrite particles, preventing the electric double layer from widening and causing the particles to aggregate and precipitate. Additionally, when the particles obtained following the acid treatment are present in an acidic aqueous solution, since the electrolyte concentration of the aqueous solution is lower than that of the slurry, electric double layers widen around the charged particles, and a repulsive force is exerted in a manner preventing overlapping of the electric double layers. With regard to the dispersion and precipitation of the particles in that state, as represented by the Stokes equation, the smaller the particle, the slower the rate of precipitation. Thus, it is possible to separate dispersion components that do not precipitate within the standing time of the process from components that do precipitate by decantation, for example. That makes it possible to selectively remove ultrafine particles of a size far from the center of the particles size distribution. Conventionally, in the glass crystallization method, a flocculant (such as ammonium oxalate) is widely added to promote the precipitation of particles (for example, see Examples of Japanese Unexamined Patent Publication (KOKAI) No. 2005-340673, which is expressly incorporated herein by reference in its entirety). The fact that components that need to be removed selectively disperse in the solution and are removed as set forth above is a new step that has been discovered by the present inventor. This step does not require special sorting equipment, can selectively remove the ultrafine particle component in the process of the glass crystallization method, and makes it possible to obtain hexagonal ferrite magnetic powder exhibiting good magnetic characteristics.

The present invention was devised based on the above discovery.

An aspect of the present invention relates to a method of manufacturing hexagonal ferrite magnetic powder, which comprises:

preparing a melt by melting a starting material mixture comprising a hexagonal ferrite-forming component and a glass-forming component and rapidly cooling the melt to obtain a solidified product;

heating the solidified product to precipitate hexagonal ferrite magnetic particles and glass components in the solidified product;

subjecting the solidified product to an acid treatment following the heating to remove the glass components by dissolution;

incorporating the hexagonal ferrite magnetic particles obtained following the acid treatment into an acidic aqueous solution, followed by separating the particles dispersed in the aqueous solution and the precipitated particles; and subjecting the precipitated particles to a cleaning treatment and then collecting the particles.

In an embodiment, the pH of the acidic aqueous solution ranges from 2.5 to 5.0.

In an embodiment, the acidic aqueous solution is an aqueous solution of an acid with a pKa in water (25° C.) of equal to or less than 3.

In an aspect, the separation of the precipitated particles from the dispersed particles is conducted by removing the particles dispersed in the aqueous solution together with the aqueous solution.

In an embodiment, the removal is conducted by decantation.

In an embodiment, the removal is conducted by decantation.

In an embodiment, the cleaning treatment is conducted by repeatedly performing water washing by decantation In an embodiment, the starting material mixture comprises Al.

In an embodiment, the starting material mixture comprises 1.0 to 10.0 mole percent of Al, based on $Al_2O_3$ conversion, relative to a total of the starting material mixture based on oxide conversion.

A further aspect of the present invention relates to hexagonal ferrite magnetic powder manufactured by the above manufacturing method.

In an embodiment, the hexagonal ferrite magnetic powder is magnetic powder for magnetic recording.

A further aspect of the present invention relates to a method of manufacturing a magnetic recording medium, which comprises:

preparing hexagonal ferrite magnetic powder by the above manufacturing method, and forming a magnetic layer with a magnetic coating material comprising the hexagonal ferrite magnetic power that has been prepared.

A further aspect of the present invention relates to a magnetic recording medium comprising a magnetic layer containing ferromagnetic powder and a binder on a nonmagnetic support, wherein the ferromagnetic power is the above hexagonal ferrite magnetic powder.

The present invention permits the removal of ultrafine particles that compromise magnetic characteristics, thereby making it possible to manufacture hexagonal ferrite magnetic powder exhibiting good magnetic characteristics by the glass crystallization method.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein:

FIG. 1 is a descriptive drawing (triangular phase diagram) showing an example of the composition of the starting material mixture.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The method of manufacturing hexagonal ferrite magnetic powder according to an aspect of the present invention comprises:

preparing a melt by melting a starting material mixture comprising a hexagonal ferrite-forming component and a glass-forming component and rapidly cooling the melt to obtain a solidified product;

heating the solidified product to precipitate hexagonal ferrite magnetic particles and glass components in the solidified product;

subjecting the solidified product to an acid treatment following the heating to remove the glass components by dissolution;

incorporating the hexagonal ferrite magnetic particles obtained following the acid treatment into an acidic aqueous solution, followed by separating the particles dispersed in the aqueous solution and the precipitated particles; and subjecting the precipitated particles to a cleaning treatment and then collecting the particles.

The method of manufacturing hexagonal ferrite magnetic powder according to an aspect of the present invention yields hexagonal ferrite magnetic powder by the glass crystallization method. As set forth above, it utilizes the fact that when magnetic particles are added to an acidic aqueous solution after dissolving away the glass component by an acid treatment, some of the particles in the aqueous solution precipitate and some disperse, tending not to precipitate, to selectively remove those ultrafine particles that are far from the center of the particle size distribution. Hexagonal ferrite magnetic powder from which the ultrafine particles have been removed in this manner can exhibit good magnetic characteristics.

The method of manufacturing hexagonal ferrite magnetic powder according to an aspect of the present invention will be described in greater detail below.

The starting material mixture employed in the glass crystallization method contains a glass-forming component and a hexagonal ferrite-forming component, and in an aspect of the present invention, the starting material containing at least the above components are employed. The term "glass-forming component" refers to a component that is capable of exhibiting a glass transition phenomenon to form an amorphous material (vitrify). A $B_2O_3$ component is normally employed as a glass-forming component in the glass crystallization method. In an aspect of the present invention, it is possible to employ a starting material mixture containing a $B_2O_3$ component as the glass-forming component. In the glass crystallization method, the various components contained in the starting material mixture are present in the form of oxides or various salts that can be converted to oxides in a step such as melting. In the present invention, the term "$B_2O_3$ component" includes $B_2O_3$ itself and various salts, such as $H_3BO_3$, that can be changed into $B_2O_3$ in the process. The same holds true for other components. Examples of glass-forming components other than $B_2O_3$ components are $SiO_2$ components, $P_2O_5$ components, and $GeO_2$ components.

Metal oxides such as $Fe_2O_3$, BaO, SrO, and PbO that serve as constituent components of hexagonal ferrite magnetic powder are examples of the hexagonal ferrite-forming component in the starting material mixture. For example, the use of a BaO component as the main component of the hexagonal ferrite-forming component makes it possible to obtain barium ferrite magnetic powder. The content of the hexagonal ferrite-forming component in the starting material mixture can be suitably set based on the desired electromagnetic characteristics.

The composition of the starting material mixture is not specifically limited. For example, the starting materials within the composition regions of hatched portions (1) to (3) in the triangular phase diagram shown in FIG. 1, with an AO component (wherein A denotes one or more selected from among Ba, Sr, Ca, and Pb, for example), $B_2O_3$ component, and $Fe_2O_3$ component as vertices, are desirable to achieve a high coercive force Hc and saturation magnetization σs. The starting materials within the component region (hatched portion (3)) defined by the four points a, b, c, and d below are particularly desirable. As set forth above, a portion of the $B_2O_3$ component can be replaced with another glass-forming component such as a $SiO_2$ component or a $GeO_2$ component. As set forth further below, it is also possible to replace a portion of the $Fe_2O_3$ component to adjust the coercive force. In addition, as set forth further below, an Al compound can be employed as a glass-forming component by replacing a portion of the $B_2O_3$ component with the Al compound.

(a) $B_2O_3$=44, AO=46, $Fe_2O_3$=10 mole percent
(b) $B_2O_3$=40, AO=50, $Fe_2O_3$=10 mole percent
(c) $B_2O_3$=21, AO=29, $Fe_2O_3$=50 mole percent
(d) $B_2O_3$=10, AO=40, $Fe_2O_3$=50 mole percent.

A portion of the Fe can be replaced with other metal elements to adjust the coercive force of the hexagonal ferrite magnetic powder obtained. Examples of these replacement elements are Co—Zn—Nb, Zn—Nb, Co, Zn, Nb, Co—Ti, Co—Ti—Sn, Co—Sn—Nb, Co—Zn—Sn—Nb, Co—Zn—Zr—Nb, and Co—Zn—Mn—Nb. To obtain such hexagonal ferrite magnetic powder, it suffices to employ an additional hexagonal ferrite-forming component to adjust the coercive force. Examples of coercive force-adjusting components are divalent metal oxide components such as CoO and ZnO, and tetravalent metal oxide components such as $TiO_2$, $ZrO_2$, $SnO_2$ and $MnO_2$, and pentavalent metal oxide components such as $Nb_2O_5$. When employing such a coercive force-adjusting component, the content can be suitably determined to achieve the desired coercive force or the like.

An aluminum (Al)-containing starting material mixture can be employed to enhance the magnetic characteristics of the hexagonal ferrite magnetic powder obtained by an aspect of the present invention. The aluminum can be added as an oxide or in the form of various salts (hydroxides or the like) that can be changed into an oxide in a melting step or the like. The use of a starting material mixture containing aluminum in a proportion of equal to or greater than 1.0 mole percent based on $Al_2O_3$ conversion, relative to the total of the starting material mixture based on oxide conversion, is desirable for the above reasons. Investigation by the present inventor determined that the surface of a magnetic recording medium that is fabricated using hexagonal ferrite magnetic powder obtained from a starting material mixture containing a large amount of aluminum will harden. When the surface of the medium hardens, there are sometimes cases where the output decreases due to abrasion of the head. From the perspective of ensuring output, the use of a starting material mixture comprising aluminum in a proportion of equal to or less than 10.0 mole percent based on $Al_2O_3$ conversion, relative to the total of the starting material mixture based on oxide conversion, is desirable.

The above starting material mixture can be obtained by weighing out and mixing the various components. Then, the starting material mixture is melted in a melting vat to obtain a melt. The melting temperature can be set based on the starting material composition, normally, to 1,000° C. to 1,500° C. The melting time can be suitably set for suitable melting of the starting material mixture.

Next, the melt that is obtained is rapidly cooled to obtain a solidified product. The solidified product is an amorphous material in the form of glass-forming components that have been rendered amorphous (vitrified). The rapid cooling can be carried out in the same manner as in the rapid cooling step commonly employed to obtain an amorphous material in glass crystallization methods. For example, a known method can be conducted, such as a rapid cooling rolling method in which the melt is poured onto a pair of water-cooling rollers being rotated at high speed.

Following the above rapid cooling, the amorphous material that is obtained is heat treated. This step can cause hexagonal ferrite magnetic particles and glass components to precipitate. When the nucleation temperature of the hexagonal ferrite magnetic particles is taken into consideration, the crystallization temperature is desirably equal to or higher than 580° C. and equal to or lower than 760° C., preferably equal to or higher than 600° C. and equal to or lower than 760° C.

The size of the hexagonal ferrite magnetic particles that precipitate can be controlled by means of the crystallization temperature and the duration of heating to induce crystallization. The crystallization temperature and the duration of heating are desirably determined so as to yield hexagonal ferrite magnetic particles of a diameter that is suited to the magnetic powder of a magnetic recording medium for high-density recording, desirably a particle diameter (primary particle diameter) of equal to or less than 35 nm, preferably in a range of 15 nm to 30 nm. However, a particle size distribution will be present among the particles precipitated by the heat treatment, and it is extremely difficult to prevent the generation of ultrafine particles that are far below the desired particle diameter. Such ultrafine particles are difficult to separate and remove by conventional sorting and processing, but can be readily separated based on an aspect of the present invention by treatment in an acidic aqueous solution following the acid treatment.

In the present invention, the particle diameter of the hexagonal ferrite magnetic powder is the plate diameter measured in a photograph taken by a transmission electron microscope (TEM). For multiple particles, the average value of the plate diameters of 500 particles extracted randomly from a TEM photograph is adopted as the average particle diameter of the hexagonal ferrite magnetic powder.

The crystallization temperature is desirably set to an optimal value within the above desirable range. A rate of temperature rise to the crystallization temperature of, for example, about 0.2 to 10° C./minute is suitable, and 0.5 to 5° C./minutes is preferable. The period of retention in the above temperature range is, for example, 0.5 to 24 hours, desirably 1 to 8 hours. In the pulverization processing and dispersion processing in a magnetic coating material set forth further below, the particle size of the hexagonal ferrite magnetic particles essentially does not change.

Hexagonal ferrite magnetic particles and crystallized glass components precipitate in the product that has been subjected to the heat treatment in the above crystallization step. When this heat-treated product is subjected to an acid treatment, the glass components surrounding the particles can be dissolved.

A pulverization treatment is desirably conducted prior to the above acid treatment to increase the efficiency of the acid treatment. Coarse pulverization can be conducted by either a dry or a wet method. From the perspective of achieving uniform pulverization, it is desirable to conduct wet pulverization. The pulverization treatment conditions can be established in accordance with known methods, or reference can be made to Examples further below.

The acid treatment can be conducted by the methods that are commonly conducted in the glass crystallization method, such as acid treatment with heating. The coarse pulverization product is desirably maintained for about 0.5 to 10 hours in an aqueous solution of acetic acid, formic acid, or butyric acid (desirably having an acid concentration of about 2 to 25 weight percent) that has been heated to 60° C. to 90° C.

As set forth above, magnetic particles normally precipitate in a relatively short time due to the effects of the ions that are present in large numbers in the solution in the above acid treatment. Since the particles that precipitate here include ultrafine particles that are far below the center of the particle size distribution, to selectively remove such ultrafine particles in an aspect of the present invention, the magnetic particles that have precipitated are recovered by a form of solid-liquid separation such as decantation or filtration and placed in an acidic aqueous solution. When that is done, the ultrafine particles contained among the magnetic particles can disperse in the acidic aqueous solution and tend not to precipitate. The other particles, including particles close to the center of the particle size distribution, can naturally precipitate in a relatively short time. This is thought to be due to the mechanism described in detail above. In an aspect of the present invention, the particles that have dispersed in the solution are separated along with the solution by a form of solid-liquid separation such as decantation from the particles that have precipitated, making it possible to readily and selectively remove ultrafine particles that are far below the center of the particle size distribution.

The above acidic aqueous solution need only have a pH in the acidic region. From the perspective of promoting separation of the ultrafine particles and other particles, an acidic aqueous solution of pH 2.5 to 5.0 is desirably employed. In one embodiment of the present invention, the magnetic particles following the acid treatment are added to water and then acid is added to the water to adjust the pH to within the acidic region. In another embodiment, the magnetic particles are added following the acid treatment to an acidic aqueous solution that has been adjusted to a pH in the acidic region. In both embodiments, when left standing for about 1 to 5 hours, some of the particles precipitate and some of the particles remain dispersed in the solution and tend not to precipitate. As expressed by the Stokes equation, the smaller the diameter of the magnetic particles, the better they disperse. Thus, by separating the dispersed magnetic particles from the other particles, it is possible to selectively remove the ultrafine particles. To conduct the separation better and relatively quickly, about 1 to 5 liters of acidic aqueous solution are desirably employed per 100 g of magnetic particles. Desirable acids employed for pH adjustment are acids with a pKa in water (25° C.) of equal to or less than 3 because the pH adjustment is possible with the addition of a small amount of acid. A specific example of a desirable acid is hydrochloric acid. It suffices to determine the quantity of acid that is added based on the type of acid being employed so as to keep the pH to within the desired range.

From the perspective of ease of handling, the magnetic particles that have been dispersed in the acidic aqueous solution are desirably removed along with the solution by a known solid-liquid separation method such as decantation.

Subsequently, the magnetic particles that have precipitated from the acidic aqueous solution are subjected to a cleaning treatment. The cleaning treatment can be conducted by the washing with water that is conducted following the acid treatment in the common glass crystallization method; for example, it can be conducted by washing with water by decantation. Since the pH in the cleaning water tends to approach neutral the more times washing in water is repeated, the level of the positive charge of the surface of the particles decreases, causing most of the particles to precipitate. Alternatively, an alkali is desirably added to the cleaning water to bring the pH of the cleaning water close to neutral, promoting precipitation of the particles and enhancing cleaning efficiency.

As described in Japanese Unexamined Patent Publication (KOKAI) No. 2005-340673, the fact that ionic components such as acid components are present in hexagonal ferrite magnetic powder will sometimes cause the precipitation of metallic salts from magnetic recording media. For that reason, the water washing treatment is desirably repeated until the ionic components that are present on the surface of the hexagonal ferrite powder are adequately removed. Reducing the electrical conductivity of the liquid at the work environment temperature (normally, about 20 to 25° C.) to within the range described in the above-cited publication of 0.02 to 6.0 mS/m can serve as a yardstick for ending water washing.

After conducting the water washing treatment, known post-processing (such as surface coating processing or drying processing) can be conducted as needed to obtain hexagonal ferrite magnetic powder.

A further aspect of the present invention relates to hexagonal ferrite magnetic powder that is manufactured by the manufacturing method of an aspect of the present invention. As set forth above, the manufacturing method of an aspect of the present invention makes it possible to remove particles that are far from the center of the particle size distribution and thus to increase the uniformity of the particle size distribution. Thus, the hexagonal ferrite magnetic powder of an aspect of the present invention that is obtained by the manufacturing method makes it possible to fabricate a magnetic recording medium having good electromagnetic characteristics. The hexagonal ferrite magnetic powder of an aspect of the present invention can be suitably employed as magnetic powder for magnetic recording.

A further aspect of the present invention relates to a method of manufacturing a magnetic recording medium comprising the steps of manufacturing hexagonal ferrite magnetic powder by the manufacturing method of an aspect of the present invention, and forming a magnetic layer using a magnetic coating material comprising the hexagonal ferrite magnetic powder that has been manufactured; and to a magnetic recording medium having a magnetic layer comprising ferromagnetic powder and a binder on a nonmagnetic support, wherein the ferromagnetic powder is the hexagonal ferrite magnetic powder of an aspect of the present invention.

Details of the magnetic recording medium and the method of manufacturing a magnetic recording medium of an aspect of the present invention will be described below.

Magnetic Layer

Details of the hexagonal ferrite magnetic powder employed in the magnetic layer and the method of manufacturing the same are as set forth above. The magnetic layer comprises a binder, in addition to the hexagonal ferrite magnetic power. Examples of the binder contained in the magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs [0029] to [0031] in Japanese Unexamined Patent Publication (KOKAI) No. 2010-24113, which is expressly incorporated herein by reference in its entirety, for details of the binder. A polyisocyanate curing agent may also be employed with the above resins.

As needed, additives can be added to the magnetic layer. Examples of additives are: abrasives, lubricants, dispersing agents, dispersion adjuvants, antifungal agents, antistatic agents, oxidation inhibitors, solvents, and carbon black. These additives can be selected for use from commercial products or products that have been prepared by a known method in a suitable quantity, based on desired properties. For the carbon black, reference can also be made to paragraph [0033] in Japanese Unexamined Patent Publication (KOKAI) No. 2010-24113.

Nonmagnetic Layer

Details of the nonmagnetic layer will be described below. The magnetic recording medium of an aspect of the present invention can comprise a nonmagnetic layer containing nonmagnetic powder and a binder between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs [0036] to [0039] in Japanese Unexamined Patent Publication (KOKAI) No. 2010-24113 for details thereof.

Binders, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto. Carbon black and organic powders can be added to the nonmagnetic layer. Reference can be made to paragraphs [0040] to [0042] in Japanese Unexamined Patent Publication (KOKAI) No. 2010-24113 for details thereof.

Nonmagnetic Support

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in the present invention desirably ranges from 3 to 10 nm.

Layer Structure

As for the thickness structure of the magnetic recording medium of an aspect of the present invention, the thickness of the nonmagnetic support desirably ranges from 3 to 80 μm.

The thickness of the magnetic layer can be optimized based on the saturation magnetization of the magnetic head employed, the length of the head gap, and the recording signal band, and is normally 10 to 150 nm, desirably 20 to 120 nm, and preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 μm, desirably 0.3 to 2.0 μm, and preferably, 0.5 to 1.5 μm in thickness. The nonmagnetic layer of the magnetic recording medium of an aspect of the present invention can exhibit its effect so long as it is substantially nonmagnetic. It can exhibit the effect of the present invention, and can be deemed to have essentially the same structure as the magnetic recording medium of an aspect of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present Backcoat Layer A backcoat layer can be provided on the surface of the nonmagnetic support opposite to the surface on which the magnetic layer is provided, in an aspect of the present invention. The backcoat layer desirably comprises carbon black and inorganic powder. The formula of the magnetic layer or nonmagnetic layer can be applied to the binder and various additives for the formation of the backcoat layer. The backcoat layer is preferably equal to or less than 0.9 μm, more preferably 0.1 to 0.7 μm, in thickness.

Manufacturing Process

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the hexagonal ferrite magnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the magnetic layer, nonmagnetic layer and backcoat layer coating liquids. Dispersing media with a high specific gravity such as zirconia beads, titania beads, and steel beads are also suitable for use. The particle diameter and filling rate of these dispersing media can be optimized for use. A known dispersing device may be employed. Reference can be made to paragraphs [0051] to [0057] in Japanese Unexamined Patent Publication (KOKAI) No. 2010-24113 for details of the method of manufacturing a magnetic recording medium.

The magnetic recording medium of an aspect of the present invention that has been set forth above can exhibit a high SNR in the high recording density region because it contains the hexagonal ferrite magnetic powder of an aspect of the present invention. It is thus suitable as a magnetic recording medium for high density recording of which good electromagnetic characteristics are required.

EXAMPLES

The present invention will be described in detail below based on examples. However, the present invention is not limited to the examples. The terms "parts" and "percent" given in Examples are weight parts and weight percent unless specifically stated otherwise.

Example 1

(1) Prescribed quantities of $H_3BO_3$ corresponding to $B_2O_3$, $Al(OH)_3$ corresponding to $Al_2O_3$, $BaCO_3$ corresponding to BaO, and $Fe_2O_3$ were weighed out so as to yield $B_2O_3$: 23.0 mole percent; $Al_2O_3$: 8.7 mole percent; BaO: 37.0 mole percent; and $Fe_2O_3$: 31.3 mole percent as converted to the oxides. These components were mixed in a mixer. The product was then charged to a two-liter platinum crucible, melted, and then cooled with water-cooled rolls to obtain an amorphous material. A 600 g quantity of the amorphous material obtained was charged to an electric furnace. The temperature was raised to 720° C. by 4° C./minute and then maintained for five hours to cause hexagonal ferrite (barium ferrite) to crystallize (precipitate).

(2) A 600 g quantity of the heat treated product that had completed the crystallization of (1) above was coarsely pulverized in a mortar, charged to a three-liter ball mill, and subjected to a pulverization treatment for 4 hours in the ball mill with 5 kg of φ 5 mm Zr balls and 1.2 kg of pure water. Subsequently, the pulverization liquid was separated from the balls and charged to a five-liter stainless steel beaker. This was then mixed with a 30 percent acetic acid solution in a ratio (weight ratio) of 3:1. While keeping the temperature at 85° C., acid treatment was conducted for two hours with stirring and the glass components were dissolved. Following the acid treatment, the slurry was left standing for one hour, resulting in separation of the transparent supernatant from the product that precipitated by the natural precipitation of a solidified product. The supernatant was removed by decantation.

(3) To a beaker from which the supernatant had been removed in (2) above was added pure water to make five liters within the beaker, after which 1 N hydrochloric acid was used to adjust the pH to 3.4. Subsequently, the product was left standing for two hours, at which point some of the magnetic particles precipitated naturally. The remainder remained dispersed in the liquid without precipitating, so the dispersion solution in which the magnetic particles had dispersed was removed by decantation from the product that had precipitated.

(4) Following the decantation described in (3) above, five liters of pure water were added to the precipitate remaining in the beaker. The pH was adjusted to 6 to 7 by adding 10 percent sodium hydroxide aqueous solution, at which point particles precipitated naturally. The supernatant was then removed by decantation. Subsequently, water washing by adding pure water and conducting decantation was repeated until the electrical conductivity of the supernatant fell within the range of 0.02 to 6.0 mS/m. Drying was then conducted to obtain barium ferrite magnetic powder (classified component B).

(5) The dispersion liquid from which the precipitate had been separated in (3) above was subjected to the addition of 10 percent sodium hydroxide aqueous solution of (5) above and the subsequent operations to obtain barium ferrite magnetic powder (classified component A).

Comparative Example 1

After conducting steps (1) and (2) in the same manner as in Example 1, the beaker from which the supernatant had been removed in (2) above was repeatedly washed with water eight times by adding pure water and conducting decantation. Subsequently, the barium ferrite magnetic powder obtained was dispersed in a large quantity of ion-exchange water to prepare a barium ferrite suspension. The suspension was then poured into an elutriation apparatus. A certain quantity of ion-exchange water was poured into a continuous elutriation apparatus of varying cross-section and the magnetic particles in the ion-exchange water that overflowed was received in a tank and concentrated by precipitation. The product was then dried to obtain barium ferrite magnetic powder (classified component A). The barium ferrite magnetic powder (classified component B) that remained in the elutriation apparatus without overflowing was recovered and dried.

Comparative Example 2

After conducting steps (1) and (2) in the same manner as in Example 1, the beaker from which the supernatant had been removed in (2) above was repeatedly washed with water eight times by adding pure water and conducting decantation. Subsequently, the precipitate that remained in the beaker following decantation was dried, yielding barium ferrite magnetic powder.

Evaluation Methods (1) Particle Diameter in Liquid of Magnetic Particles in Dispersion Solution A portion of each of the dispersion solutions obtained in the various steps of the Examples and the comparative examples was collected. The liquid that was collected was diluted with a 1:1 (by weight) mixed solvent of methyl ethyl ketone and cyclohexanone to a barium ferrite concentration of 0.2 percent to prepare a solution. The particle size distribution of the barium ferrite magnetic particles in the diluted liquid that had been prepared was measured (50 repeat measurements) with an LB-500 dynamic light-scattering particle size distribution analyzer made by Horiba Seisakusho K.K. The maximum diameter corresponding to the 50 percent cumulative distribution curve of the measured particle size distribution was adopted as the particle diameter in liquid.

(2) Component Ratio

For Example 1 and Comparative Example 1, the weights of classified components A and B were measured, after which the ratio of each of the classified components relative to the combined weight of classified components A and B was calculated.

(3) Magnetic Characteristics

A hysteresis curve was obtained using a vibrating sample magnetometer (made by Toei Industry Co., Ltd.) at an applied magnetic field of 1194 kA/m (15 kOe) at 23° C. for the magnetic powder obtained, and the coercive force Hc, saturation magnetization σs, and squareness SQ were measured.

(4) Specific Surface Area

The specific surface area of the magnetic powder obtained was determined by the BET method.

(5) Thermal Stability KuV/kT

The activation volume V and the constant of anisotropy Ku were calculated from the relational equation between the magnetization reversal volume and the Hc based on thermal fluctuation using a vibrating sample magnetometer (made by Toei Industry Co., Ltd.) with the magnetic field sweep rate of the Hc measurement element set to 3 minutes and 30 minutes. KuV/kT was obtained using the calculated values. The larger the value of KuV/kT, the greater the thermal stability of magnetization and the better the recording retention property.

$$Hc = 2Ku/Ms\{1 - [(KuT/kV)\ln(At/0.693)]^{1/2}\}$$

(In the equation, Ku: constant of anisotropy; Ms: saturation magnetization; k: Boltzmann constant; T: absolute temperature; V: activation volume; A: spin precession frequency; t: magnetic field reversal time)

(6) Observation of Particles by Transmission Electron Microscope (TEM)

The magnetic powders obtained were photographed by a transmission electron microscope (TEM), 500 particles were randomly detected in the photograph, and the volume of each particle and the average volume of 500 particles were calculated. The ratio accounted for by particles with a volume of equal to or less than 800 nm$^3$ among the 500 particles that were extracted was calculated.

The results obtained by the above evaluation methods are given in Table 1.

TABLE 1

| | | Particle diameter in liquid [nm] | Component ratio [wt %] | Magnetic characteristics σs [A·m$^2$/kg] | Hc | Specific surface area $S_{BET}$ [m$^2$/g] | Thermal stability KuV/kT | Observation by TEM Average volume [nm$^3$] | Ratio of component of equal to or less than 800 nm$^3$ |
|---|---|---|---|---|---|---|---|---|---|
| | Component | | | | | | | | |
| Ex. 1 | Classified components A | 35 | 15 | 49.6 | 190 kA/m (2388 Oe) | 102 | 40 | 2287 | 30% |
| | Classified components B | 69 | 85 | 51.1 | 203 kA/m (2555 Oe) | 88 | 75 | 2873 | 3% |
| Comp. Ex. 1 | Classified components A | Measurement was not possible. (Precipitated) | 5 | 50.2 | 198 kA/m (2490 Oe) | 91 | 60 | 2660 | 13% |
| | Classified components B | | 95 | 50.5 | 199 kA/m (2495 Oe) | 91 | 60 | 2662 | 13% |
| Comp. Ex. 2 | Total volume was processed. | — | — | 50.5 | 198 kA/m (2492 Oe) | 91 | 60 | 2659 | 13% |

Evaluation Results

Based on the particle diameter in liquid, $S_{BET}$, and TEM observation results of classified components A and B in Example 1 as given in Table 1, the ultrafine particle component in the barium ferrite magnetic powder obtained by the glass crystallization method in Example 1 was confirmed to have been selectively separated as classified component A. Based on the results given in Table 1, the barium ferrite magnetic powder (classified component B) obtained by removing the ultrafine particle component (classified component A) in Example 1 was confirmed to be better in terms of magnetic characteristics and thermal stability than classified component A and the magnetic powder the total volume of which was processed without classification in Comparative Example 2. This was because particles with a volume of equal to or less than 800 nm³, that did not contribute to enhancing magnetic characteristics and was affected by thermal fluctuation, sometimes resulting in destabilized magnetization, was primarily contained in classified component A with such particles being contained in classified component B in extremely small quantities.

Although the amount of increase in the average volume of classified component B obtained in Example 1 over the magnetic powder obtained in Comparative Example 2 was extremely small, the KuV/kT was about 30 percent better than that of the magnetic powder obtained in Comparative Example 2 and the thermal stability was greatly enhanced.

The separation of ultrafine particles on a nano order of magnitude was confirmed to be quite difficult in sorting by a water elutriation apparatus such as that described in Japanese Unexamined Patent Publication (KOKAI) No. 2003-162809 based on the results of Comparative Example 1.

Based on the above results, an aspect of the present invention was confirmed to provide hexagonal ferrite magnetic powder affording both good magnetic characteristics and thermal stability.

The present invention is useful in the field of manufacturing magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing hexagonal ferrite magnetic powder, which comprises:
    preparing a melt by melting a starting material mixture comprising a hexagonal ferrite-forming component and a glass-forming component and rapidly cooling the melt to obtain a solidified product;
    heating the solidified product to precipitate hexagonal ferrite magnetic particles and glass components in the solidified product;
    subjecting the solidified product to an acid treatment following the heating to remove the glass components by dissolution;
    incorporating the hexagonal ferrite magnetic particles obtained following the acid treatment into an acidic aqueous solution, followed by separating particles dispersed in the aqueous solution and precipitated particles; and
    subjecting the precipitated particles to a cleaning treatment and then collecting the particles.

2. The method of manufacturing hexagonal ferrite magnetic powder according to claim 1, wherein a pH of the acidic aqueous solution ranges from 2.5 to 5.0.

3. The method of manufacturing hexagonal ferrite magnetic powder according to claim 1, wherein the acidic aqueous solution is an aqueous solution of an acid with a pKa in water (25° C.) of equal to or less than 3.

4. The method of manufacturing hexagonal ferrite magnetic powder according to claim 2, wherein the acidic aqueous solution is an aqueous solution of an acid with a pKa in water (25° C.) of equal to or less than 3.

5. The method of manufacturing hexagonal ferrite magnetic powder according to claim 1, wherein the separation of precipitated particles from dispersed particles is conducted by removing the particles dispersed in the aqueous solution together with the aqueous solution.

6. The method of manufacturing hexagonal ferrite magnetic powder according to claim 2, wherein the separation of precipitated particles from dispersed particles is conducted by removing the particles dispersed in the aqueous solution together with the aqueous solution.

7. The method of manufacturing hexagonal ferrite magnetic powder according to claim 3, wherein the separation of precipitated particles from dispersed particles is conducted by removing the particles dispersed in the aqueous solution together with the aqueous solution.

8. The method of manufacturing hexagonal ferrite magnetic powder according to claim 4, wherein the separation of precipitated particles from dispersed particles is conducted by removing the particles dispersed in the aqueous solution together with the aqueous solution.

9. The method of manufacturing hexagonal ferrite magnetic powder according to claim 5, wherein the removal is conducted by decantation.

10. The method of manufacturing hexagonal ferrite magnetic powder according to claim 6, wherein the removal is conducted by decantation.

11. The method of manufacturing hexagonal ferrite magnetic powder according to claim 7, wherein the removal is conducted by decantation.

12. The method of manufacturing hexagonal ferrite magnetic powder according to claim 8, wherein the removal is conducted by decantation.

13. The method of manufacturing hexagonal ferrite magnetic powder according to claim 1, wherein the cleaning treatment is conducted by repeatedly performing water washing by decantation.

14. The method of manufacturing hexagonal ferrite magnetic powder according to claim 1, wherein the starting material mixture comprises Al.

15. The method of manufacturing hexagonal ferrite magnetic powder according to claim 1, wherein the starting material mixture comprises 1.0 to 10.0 mole percent of Al, based on $Al_2O_3$ conversion, relative to a total of the starting material mixture based on oxide conversion.

16. A method of manufacturing a magnetic recording medium, which comprises:
   preparing hexagonal ferrite magnetic powder by the manufacturing method according to claim 1,
   forming a magnetic coating material comprising the hexagonal ferrite magnetic powder and a binder, and
   forming a magnetic layer with the magnetic coating material comprising the hexagonal ferrite magnetic power and the binder.

* * * * *